(12) United States Patent
Tanaka

(10) Patent No.: US 6,754,140 B2
(45) Date of Patent: Jun. 22, 2004

(54) MAGNETO OPTICAL RECORDING MEDIUM HAVING MULTIPLE MAGNETIC LAYERS

(75) Inventor: Tsutomu Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 290 days.

(21) Appl. No.: 09/962,907

(22) Filed: Sep. 25, 2001

(65) Prior Publication Data

US 2003/0002397 A1 Jan. 2, 2003

(30) Foreign Application Priority Data

May 10, 2001 (JP) .............................. 2001-140142

(51) Int. Cl.⁷ .............................................. G11B 11/00
(52) U.S. Cl. ................ 369/13.43; 428/64.3; 369/13.38
(58) Field of Search ................... 369/13.35, 13.38, 369/13.4, 13.42, 13.43, 13.48; 428/64.3, 694 ML, 694 MM (56) References Cited

U.S. PATENT DOCUMENTS

| 5,623,458 | A | * | 4/1997 | Matsumoto et al. ..... 369/13.46 |
| 5,723,227 | A | | 3/1998 | Matsumoto et al. ........ 428/694 |
| 5,830,589 | A | * | 11/1998 | Nishimura .......... 428/694 MM |
| 6,307,816 | B1 | * | 10/2001 | Nishimura ............... 369/13.07 |

FOREIGN PATENT DOCUMENTS

JP 7-244877 9/1995

* cited by examiner

Primary Examiner—Tan Dinh
(74) Attorney, Agent, or Firm—Greer, Burns & Crain, Ltd.

(57) ABSTRACT

A magneto-optical recording medium for recording and reproducing data through light irradiation on a magnetic film side of the medium, the medium including at least one magnetic film which is formed on a substrate and has an easy axis of magnetization in a perpendicular direction and an in-plane magnetic film which is formed between the substrate and the magnetic film and has an easy axis of magnetization in an in-plane direction.

5 Claims, 8 Drawing Sheets

MAGNETO OPTICAL RECORDING MEDIUM HAVING MULTIPLE MAGNETIC LAYERS

CROSS-REFERENCE TO RELATED APPLICATION

This application is related to Japanese application No. 2001-140142 filed on May 10, 2001, whose priority is claimed under 35 USC § 119, the disclosure of which is incorporated by reference in its entirety.

BACKGROUND OF THE INVENTION

1. Field of the Invention

The present invention relates to a magneto-optical recording medium (hereinafter may be referred to as "a medium"). More specifically, it relates to a magneto-optical recording medium including a magneto-optical disc, tape, card and the like applied to a magneto-optical recording/reproducing device.

2. Description of Related Art

As an external recording device for computers, attention has recently been focused on a magneto-optical recording medium such as a magneto-optical disc. On the magneto-optical recording medium, recording bits in a submicron order are formed by applying an external magnetic field and irradiating a laser beam. Therefore, a recording capacitance of the magneto-optical recording medium can be increased as compared with conventional external recording media such as a floppy disc and a hard disc.

For example, a currently utilized 3.5 inch magneto-optical disc is provided with tracks at 0.9 $\mu$m pitch within a radius of about 24–40 mm and recording marks of 0.38 $\mu$m at the minimum are formed along a circumference direction, so that a recording capacitance of about 1.3 GB is obtained per one side of the disc. This medium reproduces data with a magnetically induced super-resolution technology, which is capable of reproducing recording marks smaller than beam spots.

More specifically, there has been known a technique for reading recording marks not exceeding a diffraction limit by reproducing only in a moderate temperature region while using a low temperature region and a high temperature region in a beam spot as masks. The technique is called as double mask RAD system (Japanese Unexamined Patent Publication No. Hei 7(1995)-244877).

However, in view of future multimedia generation, it is necessary to further increase the recording density to record enormous data and animation. In order to raise the recording density, more recording marks must be formed on the medium and therefore it is required to shorten the mark length and the distance between the marks.

To achieve the high density recording in such a manner, it may be possible to reduce a wavelength of a laser beam to be applied smaller than a currently used wavelength of 780 nm or 680 nm. However, in view of practical application, it is more effective to shorten the mark length rather than the laser wavelength.

For reading the short recording marks with a laser beam of unchanged wavelength, there is a method of raising NA (number of aperture) of an objective lens. With the raise of the NA, resolution capability increases so that much smaller marks can be read out. For example, an objective lens for the above-mentioned magneto-optical disc having the recording capacitance of about 1.3 GB has the NA of 0.55. By raising the NA to 0.8, the recording capacitance can be increased.

However, the more the NA increases, the more a thickness of a substrate needs to be reduced because a focus distance becomes small in accordance with the increase of the NA. Accordingly, where an objective lens having the NA greater than a conventional value is used, high capacitance can effectively be realized with a medium suitable for recording/reproducing through light irradiation on a magnetic film side of the medium, rather than with a medium suitable for recording/reproducing through light irradiation on a substrate side of the medium. In the former medium, films comprising the medium are formed in an order completely opposite to an order of forming films in the latter conventional medium.

In the above-described medium having a film structure opposite from that of the conventional medium, a thickness and a material of a layer below the magnetic film are different as compared with the conventional medium. Therefore, magnetic characteristics of the magnetic film are utterly different from those of the conventional medium, which deteriorates recording/reproducing characteristics.

SUMMARY OF THE INVENTION

An object of the present invention is to provide a magneto-optical recording medium which exhibits high recording/reproducing characteristics, is capable of improving the recording density, and particularly advantageous to the use of an objective lens of high NA even if its layered structure is in the opposite order from that of the conventional medium.

According to the present invention, provided is a magneto-optical recording medium for recording and reproducing data through light irradiation on a magnetic film side of the medium, the medium comprising at least one magnetic film which is formed on a substrate and has an easy axis of magnetization in a perpendicular direction and an in-plane magnetic film which is formed between the substrate and the magnetic film and has an easy axis of magnetization in an in-plane direction.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Hereinafter, the structure of the medium according to the present invention will be explained.

The present invention relates to a magneto-optical recording medium comprising at least one magnetic film having an easy axis of magnetization in a perpendicular direction and recording and reproducing data through light irradiation on a magnetic film side of the medium, i.e., a so-called front illumination type medium. Further, one of the features of the medium according to the present invention is that an in-plane magnetic film having an easy axis of magnetization in an in-plane direction is formed between a substrate and a magnetic film.

The principle of improvement in recording density of the medium according to the present invention is considered as described below.

Figure 1:
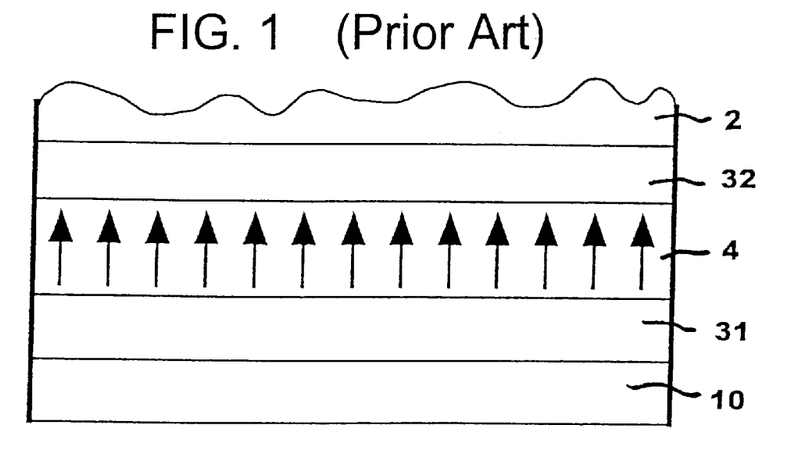
FIG. 1 is a schematic sectional view illustrating a conventional medium.

Regarding a conventional medium which records/reproduces data through light irradiation on a substrate side of the medium (a back illumination type medium) as shown in FIG. 1, a recording film having an easy axis of magnetization in a perpendicular direction shows a substantially uniform magnetization orientation. FIG. 1 shows a magnetic film 4, a reflecting heat radiation film 2, a substrate 10, a first dielectric film 31 and a second dielectric film 32. Arrows indicate the magnetization orientation (hereinafter the same is applied).

Figure 2:
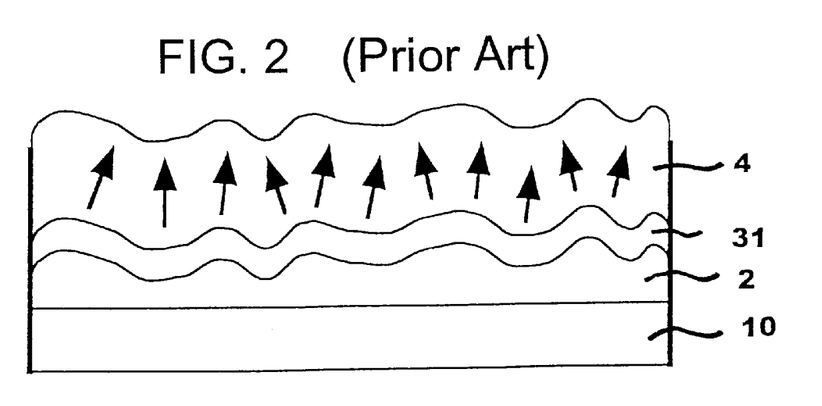
FIG. 2 is a schematic sectional view illustrating a conventional medium.

In contrast to the above, a conventional medium of front illumination type as shown in FIG. 2 includes a reflecting heat radiation film 2 made of an Al alloy or the like having surface roughness. Accordingly, a first dielectric film 31 and a magnetic film 4 to be formed on the reflecting heat radiation film 2 also show the surface roughness. Since the magnetization orientation of the magnetic film 4 is in a substantially perpendicular direction with respect to its bottom surface, the magnetization orientation cannot be uniform because of the surface roughness. Therefore, perpendicular magnetic anisotropy of the magnetic film becomes small as compared with the back illumination type medium, which results in small retentiveness.

The medium according to the present invention solves the problem caused by the surface roughness of the magnetic film by forming an in-plane magnetic film having an easy axis of magnetization in an in-plane direction between the magnetic film and the substrate. An exemplary structure of the medium according to the present invention is shown in FIG. 3.

Figure 3:
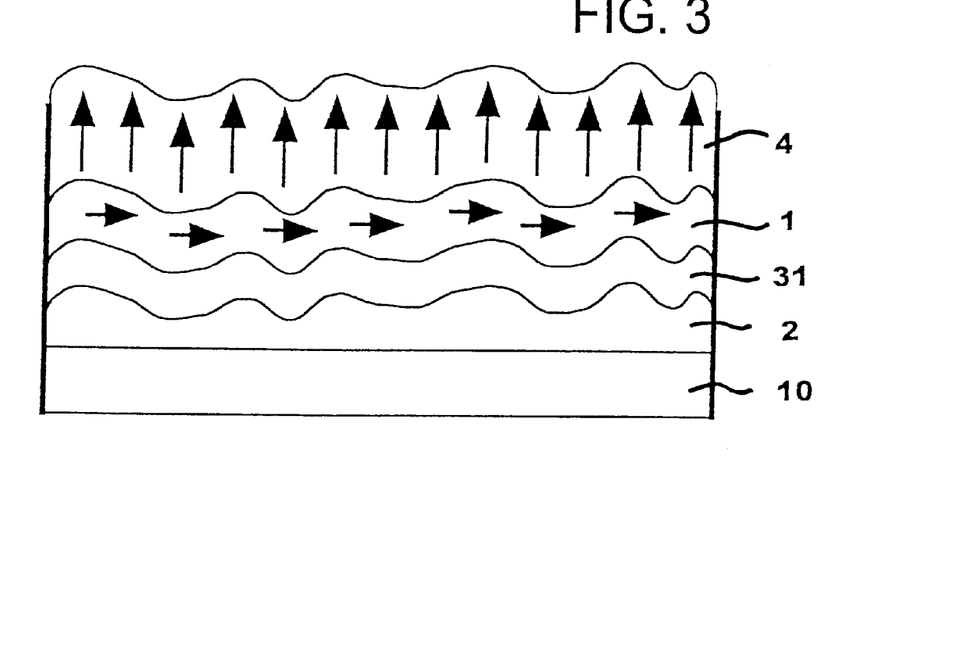
FIG. 3 is a schematic sectional view illustrating a medium according to the present invention.

In FIG. 3, an in-plane magnetic film 1 is formed between a magnetic film 4 and a first dielectric film 31. Regardless of the surface roughness of the magnetic film 4, uniform magnetization orientation in a substantially perpendicular direction is obtained.

Figure 4:
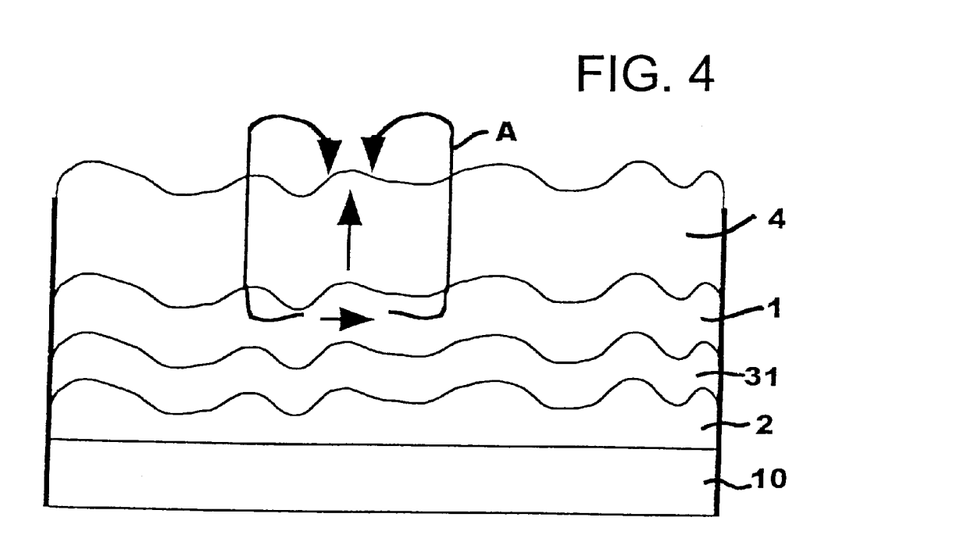
FIG. 4 is a schematic sectional view illustrating an effect of an in-plane magnetic film of the medium according to the present invention.

The principle of this phenomenon is explained with reference to FIG. 4. The in-plane magnetic film 1 is relatively endurable against the influence of the surface roughness and its magnetization orientation is almost in the in-plane direction. Due to a magnetic force line A exerted from the in-plane magnetic film 1, the magnetic film 4 shows the magnetization orientation in a substantially perpendicular direction. Accordingly, the perpendicular magnetic anisotropy of the magnetic film 4 is improved, which raises the retentiveness and CNR (Carrier Noise Ratio).

The medium according to the present invention is characterized by including the substrate 10, the in-plane magnetic film 1 and at least one magnetic film 4 having the easy axis of magnetization in the perpendicular direction. It may be possible that the medium is further provided with other layers generally utilized in the medium. Examples of the other layers include a reflecting heat radiation film, a dielectric film, a reproduction enhancing film, a protective film and the like. The dielectric film may be formed on both sides of the magnetic film.

The medium of the present invention may be constructed of the following sets of components:

(1) a substrate 10, an in-plane magnetic film 1, a reflecting heat radiation film 2, a first dielectric film 31, a magnetic film 4 and a second dielectric film 32;

(2) a substrate 10, a reflecting heat radiation film 2, an in-plane magnetic film 1, a first dielectric film 31, a magnetic film 4 and a second dielectric film 32;

(3) a substrate 10, a reflecting heat radiation film 2, a first dielectric film 31, an in-plane magnetic film 1, a magnetic film 4 and a second dielectric film 32; and (4) a substrate 10, a reflecting heat radiation film 2, a first dielectric film 31, an in-plane magnetic film 1, a magnetic film 4, a reproduction enhancing film 12 and a second dielectric film 32.

It is preferred that the in-plane magnetic film 1 is arranged as close as possible to the magnetic film 4 because uniform magnetization orientation of the magnetic film 4 is effectively obtained. Therefore, the above-mentioned structures of (3) and (4) are more preferable.

The in-plane magnetic film 1 may be formed of any material as long as it shows the orientation of the magnetization (an easy axis of magnetization) in the in-plane direction. Examples of the material include GdFe, GdFeCo, TbFe, TbFeCo, DyFeCo, CoCrTa, FeCoNi, garnet and the like. It is particularly preferable that the in-plane magnetic film 1 contains Gd so that higher signal quality is obtained. The composition ratio of the elements of the in-plane magnetic film 1 may suitably be adjusted so that the magnetization orientation is aligned with the in-plane direction. For example, in an in-plane magnetic film of GdFeCo, the ratio of Gd with respect to the entire film may preferably be 26.5–36.2 atom %.

As the substrate 10 used in the medium of the present invention, any substrate known in the art may be used without any particular limitation. Since the medium of the present invention is of a front illumination type, an opaque substrate can also be used. Specifically, the substrate may be a plastic substrate, a glass substrate, a silicon substrate, an Al substrate or the like.

As the reflecting heat radiation film 2, any reflecting heat radiation film known in the art may be used without any particular limitation. Specifically, the reflecting heat radiation film may be a metal film made of Al, Ag, Au, Pt or the like, or an Al alloy film made of AlCr, AlTi or the like.

As the dielectric films 31 and 32, any film known in the art may be used without any particular limitation. Examples of the dielectric film include a SiN film, a $SiO_2$ film, a $ZnS-SiO_2$ film, an AlN film and the like.

The reproduction enhancing film 12 may be formed of any material as long as it shows the orientation of the magnetization in the in-plane direction. Any reproduction enhancing film known in the art may be used. Specifically, the material may be GdFe, GdFeCo, TbFe, TbFeCo, DyFeCo, CoCrTa, FeCoNi, garnet or the like.

The magnetic film 4 may be a multilayer magnetic film consisted of a reproducing layer 43, an intermediate layer 42 and a recording layer 41. Any known layers may be used as the reproducing layer 43, the intermediate layer 42 and the recording layer 41 without any particular limitation. In particular, a layer of a rare earth-transition metal alloy is preferably used. Examples thereof include a layer of GdFe, TbFeCo, GdFeCo, TbDyFeCo, TbGdFeCo, DyGdFeCo, GdFeCoSi or the like. In the multilayer magnetic layer, the composition ratio and the combination of the constituents may suitably be adjusted so that desired characteristics are obtained. For example, GdFeCo, GdFe and TbFeCo are used as the materials of the reproducing layer, the intermediate layer and the recording layer, respectively.

A thickness of each of the films comprising the medium is not particularly limited, and may suitably be determined depending on the composition ratio of the films to be employed.

Where the magnetic film 4 is made of the multilayer magnetic film comprising the reproducing layer 43, the intermediate layer 42 and the recording layer 41, the thicknesses of the layers are preferably 20–50 nm, 10–30 nm and 30–80 nm, respectively.

The films comprising the medium may be formed by any method without any particular limitation. A known method such as DC sputtering may be used.

A method of recording/reproducing data with the medium according to the present invention is not particularly limited as long as a reproducing light beam is irradiated on a magnetic film side of the medium for the reproduction. Accordingly, any known method may be utilized. The medium of the present invention is advantageous in that NA of an objective lens used for irradiating the reproducing light beam is effectively raised greater than that of a conventional lens. More specifically, according to the present invention, the NA can be raised from a conventional value of about 0.55 to about 0.8 or more.

EXAMPLES

Example 1

Figure 5:
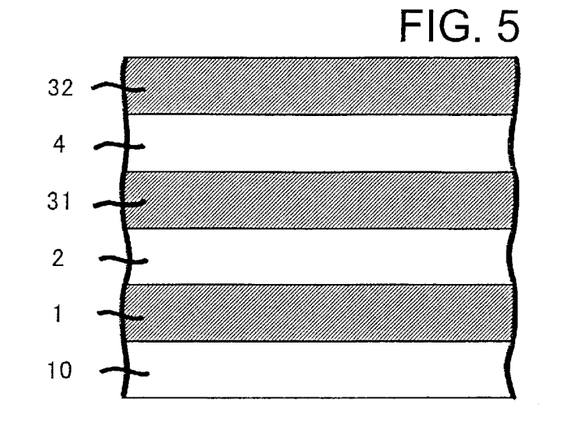
FIG. 5 is a schematic sectional view illustrating a medium wherein the in-plane magnetic film according to the present invention is provided between a substrate and a reflecting heat radiation film.

FIG. 5 shows a medium according to Example 1. A substrate 10 used in the medium of Example 1 is a polycarbonate substrate of 1.2 mm thick provided with lands and grooves (35 nm in depth) at 0.4 μm pitch, respectively.

On the substrate 10, an in-plane magnetic film 1 of Gd30Fe45Co25 (atom %: the same is applied hereinbelow), a reflecting heat radiation film 2 of AlTi, a first dielectric film 31 of SiN, a magnetic film 4 serves as a recording layer of Tb20Fe72Co8 and a second dielectric film 32 of SiN are provided in this order.

These films were formed by DC sputtering. The film formation was carried out in the following manner.

First, a SiN target for forming the first and second dielectric films 31 and 32, a GdFeCo target for forming the in-plane magnetic film 1, a TbFeCo target for forming the magnetic film 4 and an AlTi target for forming the reflecting heat radiation film 2 were installed in a sputtering chamber.

Then, the substrate was introduced in the chamber, a vacuum of $1 \times 10^{-5}$ Pa was formed in the chamber, and then Ar gas was introduced in the chamber to obtain a chamber pressure of 0.4 Pa. Under this atmosphere, the in-plane magnetic film 1 of 30 nm thick was formed on the substrate 10 by DC sputtering at applied power of 0.5 kW.

Then, the vacuum of $1 \times 10^{-5}$ Pa was formed again in the chamber and then Ar gas was introduced in the chamber to obtain the chamber pressure of 0.8 Pa. Under this atmosphere, the reflecting heat radiation film 2 of 90 nm thick was formed on the in-plane magnetic film 1 by DC sputtering at applied power of 0.5 kW.

Then, the vacuum of $1 \times 10^{-5}$ Pa was formed again in the chamber and then Ar gas and $N_2$ gas were introduced in the chamber at a partial pressure of 3:2 to obtain the chamber pressure of 0.4 Pa. Under this atmosphere, the first dielectric film 31 of 15 nm thick was formed on the reflecting heat radiation film 2 by DC sputtering at applied power of 0.5 kW.

Then, the vacuum of $1 \times 10^{-5}$ Pa was formed again in the chamber and then Ar gas was introduced in the chamber to obtain the chamber pressure of 0.8 Pa. Under this atmosphere, the magnetic film of 25 nm thick was formed on the first dielectric film 31 by DC sputtering at applied power of 0.5 kW.

Further, the vacuum of $1 \times 10^{-5}$ Pa was formed again in the chamber and then Ar gas and $N_2$ gas were introduced in the chamber at a partial pressure of 3:2 to obtain the chamber pressure of 0.4 Pa. Under this atmosphere, the second dielectric film 32 of 60 nm thick was formed on the magnetic film 4 by DC sputtering at applied power of 0.5 kW.

In the above-mentioned steps, the chamber pressure for forming the in-plane magnetic film 1 was adjusted lower than that for forming the magnetic film 4 so that an easy axis of magnetization of the in-plane magnetic film 1 could easily be aligned with an in-plane direction.

Signal quality characteristics (CNR) of the medium according to Example 1 were measured by means of a measurement apparatus with a semiconductor laser beam having a wavelength of 660 nm and an objective lens having NA of 0.85. The data recording/reproducing was carried out by irradiating a magnetic film side of the medium rotating at 7.5 m/s with the laser beam. Table 1 shows CNR values obtained in the case where the recording mark length was 0.4 μm.

Comparative Example 1

Figure 6:
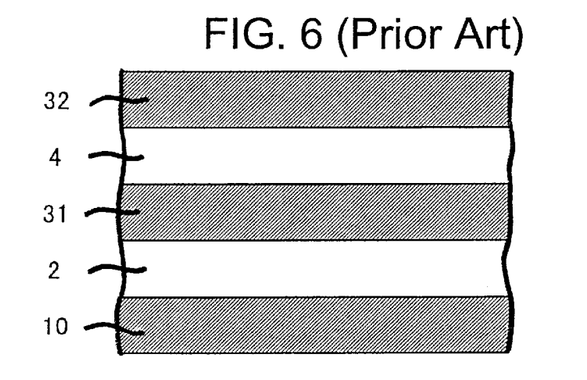
FIG. 6 is a schematic sectional view illustrating a conventional medium.

A medium as shown in FIG. 6 was formed in the same manner as in Example 1 except that the in-plane magnetic film 1 was not formed. CNR of the thus obtained medium was measured in the same manner as in Example 1. Table 1 shows the results.

Example 2

Figure 7:
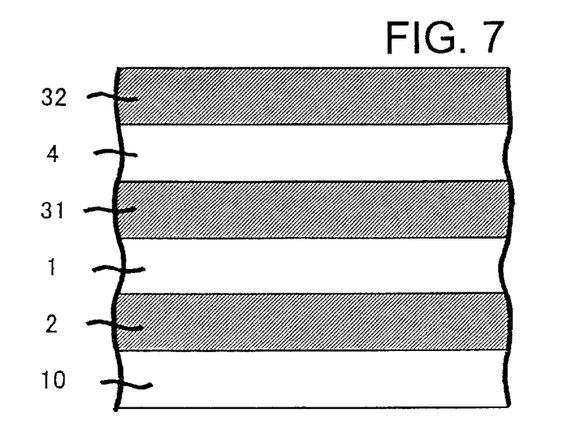
FIG. 7 is a schematic sectional view illustrating a medium wherein the in-plane magnetic film according to the present invention is provided between a reflecting heat radiation film and a first dielectric film.

A medium as shown in FIG. 7 was formed in the same manner as in Example 1 except that the in-plane magnetic film 1 of 15 nm thick was formed between the reflecting heat radiation film 2 and the first dielectric film 31. CNR of the thus obtained medium was measured in the same manner as in Example 1. Table 1 shows the results.

Example 3

Figure 8:
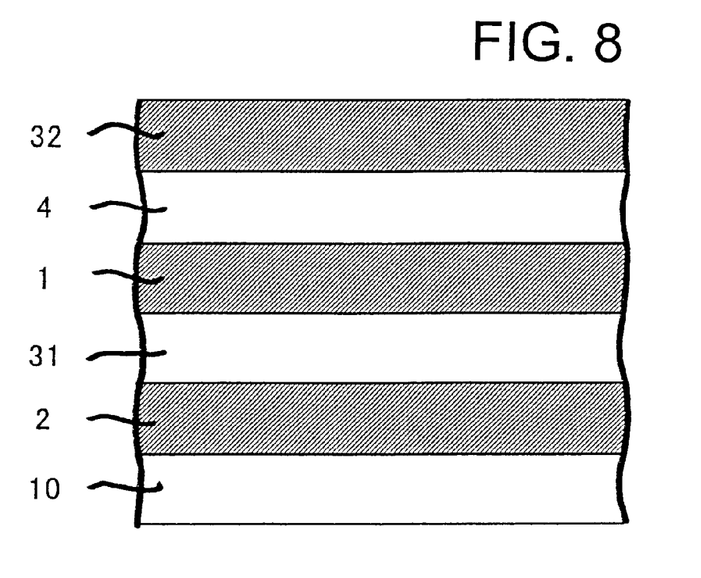
FIG. 8 is a schematic sectional view illustrating a medium wherein the in-plane magnetic film according to the present invention is provided between a first dielectric film and a magnetic film.

A medium as shown in FIG. 8 was formed in the same manner as in Example 1 except that the in-plane magnetic film 1 of 15 nm thick was formed between the first dielectric film 31 and the magnetic film 4. CNR of the thus obtained medium was measured in the same manner as in Example 1. Table 1 shows the results.

Example 4

Figure 9:
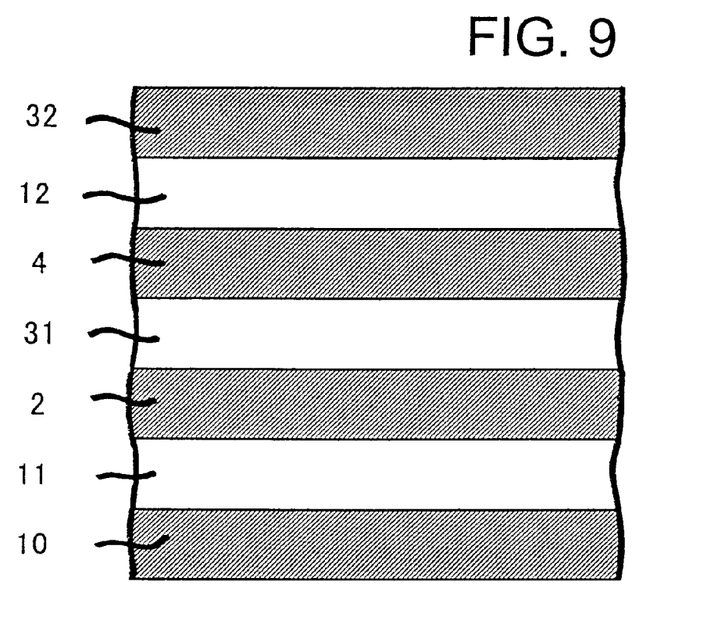
FIG. 9 is a schematic sectional view illustrating a medium wherein the in-plane magnetic film according to the present invention is provided between a substrate and a reflecting heat radiation film, and a reproduction enhancing film is provided between a magnetic film and a second dielectric film.

A medium as shown in FIG. 9 was formed in the same manner as in Example 1 except that the in-plane magnetic film 11 of 30 nm thick and the magnetic film 4 of 17 nm thick were formed and a reproduction enhancing film 12 (Gd22.5Fe57.5Co20) was formed between the magnetic film 4 and the second dielectric film 32. The reproduction enhancing film 12 was formed in the following manner. A GdFeCo target for forming the reproduction enhancing film was introduced in the chamber before the formation of the other films. A vacuum of $1 \times 10^{-5}$ Pa was formed in the chamber after forming the magnetic film 4 and then Ar gas was introduced in the chamber to obtain a chamber pressure of 0.8 Pa. Under this atmosphere, the reproduction enhancing film 12 of 8 nm thick was formed on the magnetic film 4 by DC sputtering at applied power of 0.5 kW. CNR of the thus obtained medium was measured in the same manner as in Example 1. Table 1 shows the results.

Example 5

Figure 11:
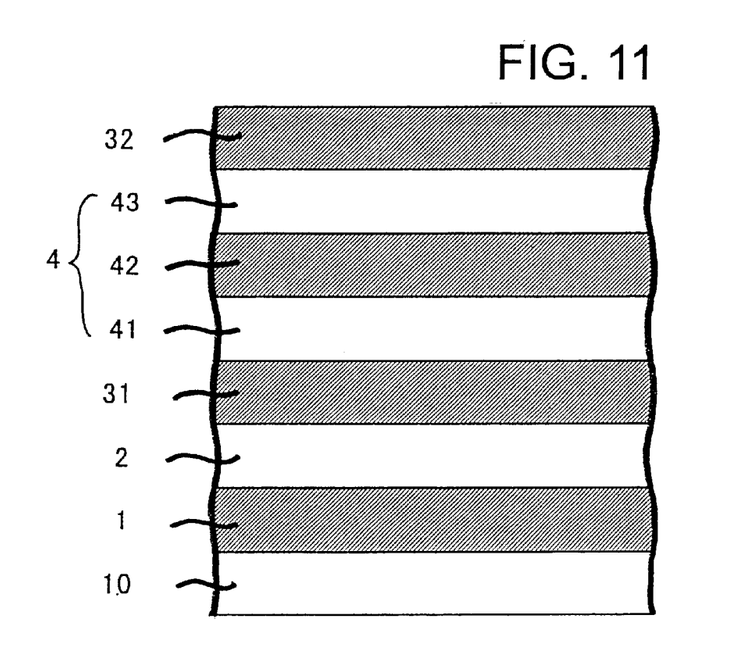
FIG. 11 is a schematic sectional view illustrating a medium wherein the in-plane magnetic film according to the present invention is provided between a substrate and a reflecting heat radiation film.

FIG. 11 shows a medium according to Example 5. A substrate 10 used in the medium of Example 5 is the same as that used in Example 1. On the substrate 10, an in-plane magnetic film 1 of Gd30Fe45Co25, a reflecting heat radiation film 2 of AlTi, a first dielectric film 31 of SiN, a magnetic film 4 consisted of a recording layer 41, an intermediate layer 42 and a reproducing layer 43, and a second dielectric film 32 of SiN were formed in this order. In the magnetic film 4, the recording layer 41 is made of Tb22Fe58Co20, the intermediate layer 42 is made of Gd29Fe71 and the reproducing layer 43 is made of Gd27.5Fe49Co23.5. The three layers constitute a magnetically induced super-resolution medium.

These films were formed by DC sputtering in the following manner.

First; a SiN target for forming the first and second dielectric films 31 and 32, a GdFeCo target for forming the in-plane magnetic film 1, a TbFeCo target for forming the recording layer 41, a GdFe target for forming the intermediate layer 42, a GdFeCo target for forming the reproducing layer 43 and an AlTi target for forming the reflecting heat radiation film 2 were installed in a sputtering chamber.

Then, the substrate 10 was introduced in the chamber, a vacuum of $1 \times 10^{-5}$ Pa was formed in the chamber, and then Ar gas was introduced in the chamber to obtain a chamber pressure of 0.4 Pa. Under this atmosphere, the in-plane magnetic film 1 of 30 nm thick was formed on the substrate 10 by DC sputtering at applied power of 0.5 kW.

Then, the vacuum of $1 \times 10^{-5}$ Pa was formed again in the chamber and Ar gas was introduced in the chamber to obtain the chamber pressure of 0.8 Pa. Under this atmosphere, the reflecting heat radiation film 2 of 30 nm thick was formed on the in-plane magnetic film 1 by DC sputtering at applied power of 0.5 kW.

Then, the vacuum of $1 \times 10^{-5}$ Pa was formed again in the chamber and then Ar gas and $N_2$ gas were introduced in the chamber at a partial pressure of 3:2 to obtain the chamber pressure of 0.4 Pa. Under this atmosphere, the first dielectric film 31 of 60 nm thick was formed on the reflecting heat radiation film 2 by DC sputtering at applied power of 0.5 kW.

Then, the vacuum of $1 \times 10^{-5}$ Pa was formed again in the chamber and Ar gas was introduced in the chamber to obtain the chamber pressure of 0.8 Pa. Under this atmosphere, the recording layer 41 of 50 nm thick was formed on the first dielectric film 31 by DC sputtering at applied power of 0.5 kW.

Then, the vacuum of $1 \times 10^{-5}$ Pa was formed again in the chamber and Ar gas was introduced in the chamber to obtain the chamber pressure of 0.8 Pa. Under this atmosphere, the intermediate layer 42 of 40 nm thick was formed on the recording layer 41 by DC sputtering at applied power of 0.5 kW.

Then, the vacuum of $1 \times 10^{-5}$ Pa was formed again in the chamber and Ar gas was introduced in the chamber to obtain the chamber pressure of 0.8 Pa. Under this atmosphere, the reproducing layer 43 of 40 nm thick was formed on the intermediate layer 42 by DC sputtering at applied power of 0.5 kW.

Further, the vacuum of $1 \times 10^{-5}$ Pa was formed again in the chamber and then Ar gas and $N_2$ gas were introduced in the chamber at a partial pressure of 3:2 to obtain the chamber pressure of 0.4 Pa. Under this atmosphere, the second dielectric film 32 of 90 nm thick was formed on the reproducing layer 43 by DC sputtering at applied power of 0.5 kW.

CNR of the thus obtained medium was measured in the same manner as in Example 1 except that the recording mark length was changed to 0.3 µm. Table 2 shows the results.

Comparative Example 2

Figure 10:
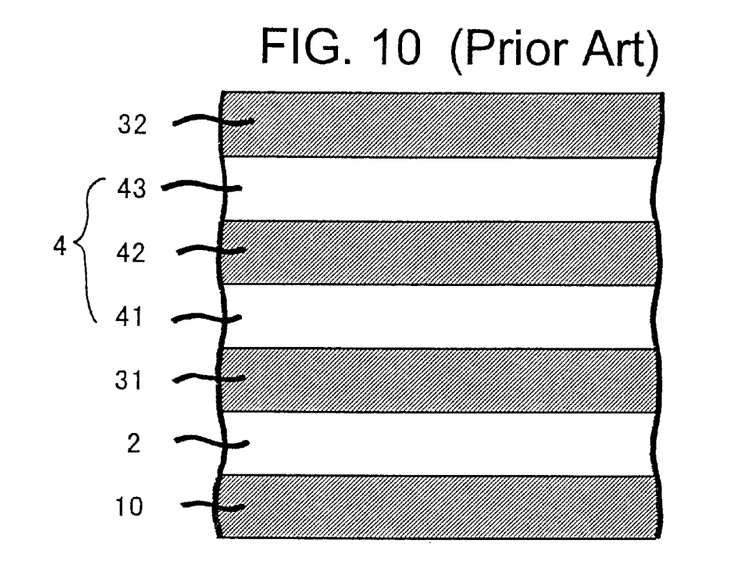
FIG. 10 is a schematic sectional view illustrating a conventional medium.

A medium as shown in FIG. 10 was formed in the same manner as in Example 5 except that the in-plane magnetic film 1 was not formed. CNR of the thus obtained medium was measured in the same manner as in Example 5. Table 2 shows the results.

Example 6

Figure 12:
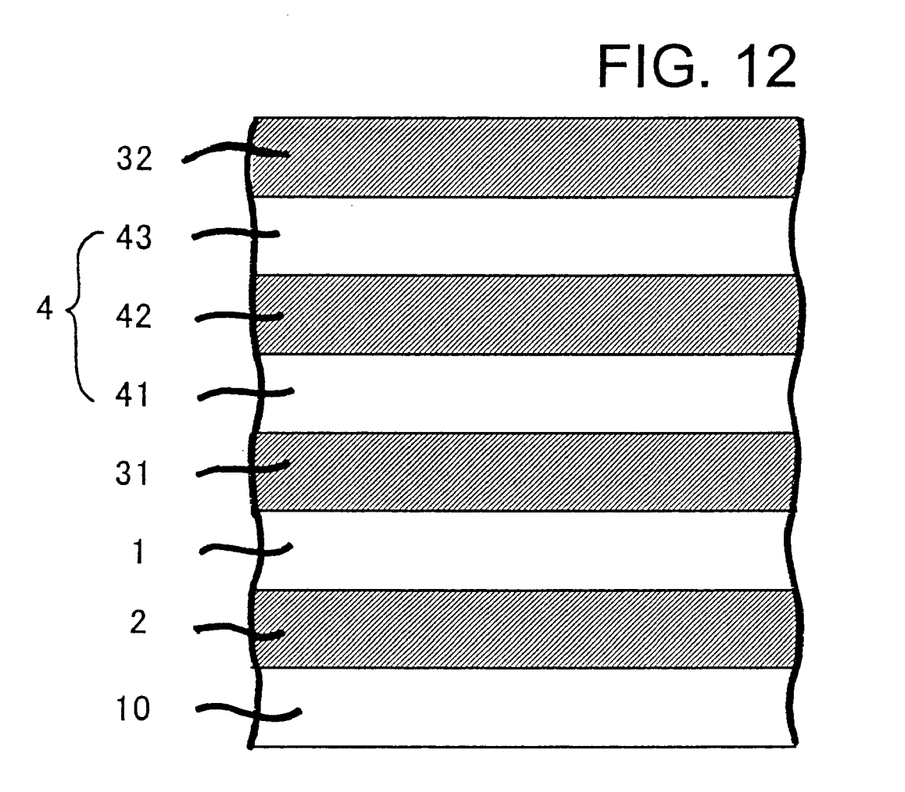
FIG. 12 is a schematic sectional view illustrating a medium wherein the in-plane magnetic film according to the present invention is provided between a reflecting heat radiation film and a first dielectric film.

A medium as shown in FIG. 12 was formed in the same manner as in Example 5 except that the in-plane magnetic film 1 of 15 nm thick was formed between the reflecting heat radiation film 2 and the first dielectric film 31. CNR of the thus obtained medium was measured in the same manner as in Example 5. Table 2 shows the results.

Example 7

Figure 13:
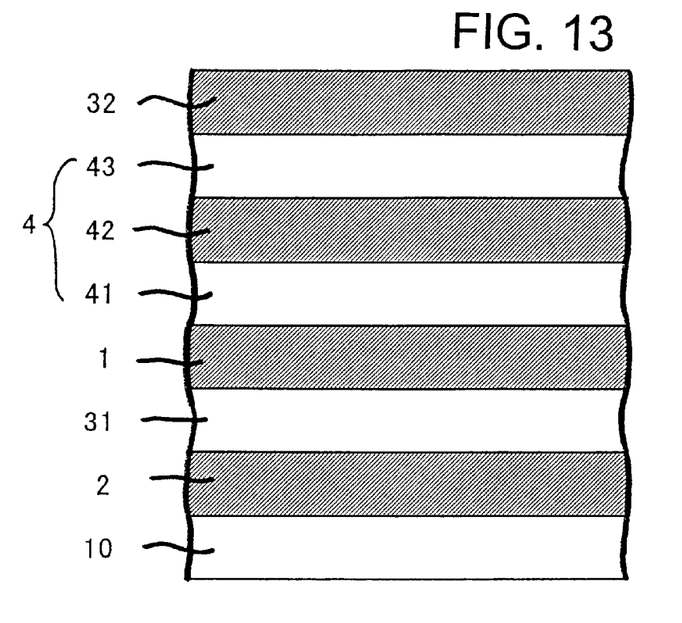
FIG. 13 is a schematic sectional view illustrating a medium wherein the in-plane magnetic film according to the present invention is provided between a first dielectric film and a recording layer.

A medium as shown in FIG. 13 was formed in the same manner as in Example 5 except that the in-plane magnetic film 1 of 15 nm thick was formed between the first dielectric film 31 and the magnetic film 4. CNR of the thus obtained medium was measured in the same manner as in Example 5. Table 2 shows the results.

Example 8

Figure 14:
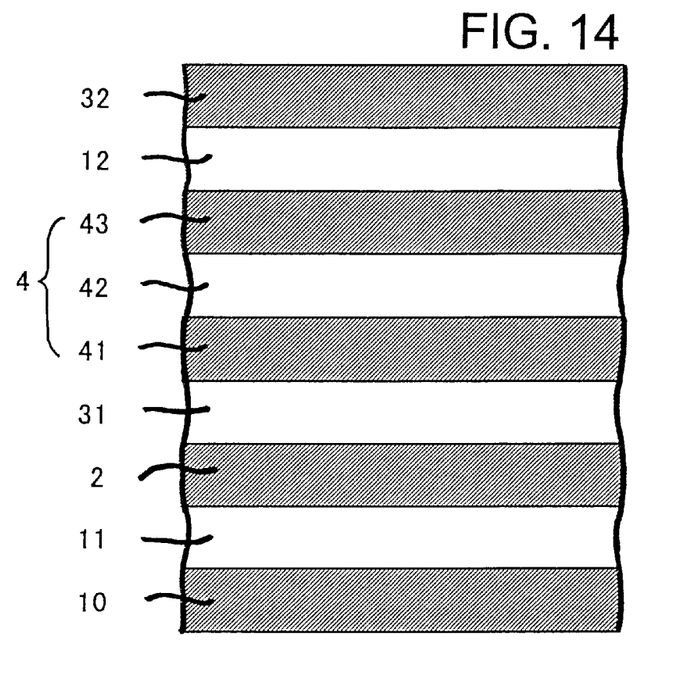
FIG. 14 is a schematic sectional view illustrating a medium wherein the in-plane magnetic film according to the present invention is provided between a substrate and a reflecting heat radiation film, and a reproduction enhancing film is provided between a reproducing layer and a second dielectric film.

A medium as shown in FIG. 14 was formed in the same manner as in Example 5 except that the in-plane magnetic film 11 of 30 nm thick and the reproducing layer 43 of 35 nm thick were formed and a reproduction enhancing film 12 of Gd27.5Fe49Co23.5 was formed between the reproducing layer 43 and the second dielectric film 32. The reproduction enhancing film 12 was formed in the following manner. A GdFeCo target for forming the reproduction enhancing film 12 was introduced in the chamber before the formation of the other films. A vacuum of $1 \times 10^{-5}$ Pa was formed in the chamber after forming the reproducing layer 43 and then Ar gas was introduced in the chamber to obtain a chamber pressure of 0.8 Pa. Under this atmosphere, the reproduction enhancing film 12 of 15 nm thick was formed on the reproducing layer 43 by DC sputtering at applied power of 0.5 kW. CNR of the thus obtained medium was measured in the same manner as in Example 5. Table 2 shows the results.

TABLE 1

| Medium | CNR |
| --- | --- |
| Example 1 | 47.3 dB |
| Comparative Example 1 | 45.0 dB |
| Example 2 | 47.5 dB |
| Example 3 | 47.8 dB |
| Example 4 | 48.3 dB |

TABLE 2

| Medium | CNR |
| --- | --- |
| Example 5 | 45.8 dB |
| Comparative Example 2 | 44.5 dB |
| Example 6 | 45.9 dB |
| Example 7 | 46.6 dB |
| Example 8 | 46.8 dB |

As seen in Tables 1 and 2, the media obtained in Examples 1–8 showed CNR values higher than those of the media obtained in Comparative Examples 1 and 2. Where the reproduction enhancing film 12 is formed as in Examples 4 and 8, amplitude of a reproducing wavelength increases because the film has a greater Kerr rotation angle as compared with the recording layer 41 of Example 4 and the reproducing layer 43 of Example 8.

Even if the first and/or second dielectric film was made of $SiO_2$, ZnS-$SiO_2$, or AlN in place of SiN, obtained results were similar to those shown in Tables 1 and 2. Further, where the reflecting heat radiation film 2 was made of Ag, Al, AlCr, Au, or Pu instead of AlTi, obtained results were similar to those shown in Tables 1 and 2.

Example 9

Media were formed in the same manner as in Example 7 except that a Gd30Fe70 film of 15 nm thick, a Tb28Fe72 film of 20 nm thick, a Tb32Fe48Co20 film of 15 nm thick and a Dy35Fe40Co25 film of 25 nm thick were used, respectively, in place of the in-plane magnetic film 1 of GdFeCo. These in-plane magnetic films 1 were formed in the same manner as the formation of the GdFeCo in-plane magnetic film except that targets corresponding to the films were used, respectively. CNR values of the thus obtained media were measured in the same manner as in Example 5. FIG. 3 shows the results.

TABLE 3

| In-plane magnetic film | CNR |
| --- | --- |
| GdFeCo (Example 7) | 46.6 dB |
| GdFe | 46.3 dB |
| TbFe | 45.9 dB |
| TbFeCo | 46.0 dB |
| DyFeCo | 45.6 dB |

The media each utilizing the in-plane magnetic films 1 formed of the above materials showed higher CNR values than the medium formed in Comparative Example 2. In particular, it was found that the in-plane magnetic film 1 formed of a material containing Gd further improves the CNR of the medium.

Every film described above is made of an amorphous material of rare earth-transition metal. Other materials than the above, e.g., CoCrTa, FeCoNi and crystal materials such as garnet, are also considered to be effective because it is important to spread the magnetic effect of the in-plane magnetic film 1 to the magnetic film 4 during the formation of the magnetic film 4.

Example 10

Media were formed in the same manner as in Example 8 except that the atomic percentage of Gd in the in-plane magnetic film 11 was varied. CNR values of the thus obtained media were measured in the same manner as in Example 5. Table 4 shows the results.

TABLE 4

| In-plane magnetic film | CNR |
| --- | --- |
| Gd26.0(Fe64.5Co35.5)74.0 | 44.6 dB |
| Gd26.5(Fe64.5Co35.5)73.5 | 44.8 dB |
| Gd27.4(Fe64.5Co35.5)72.6 | 45.8 dB |
| Gd28.0(Fe64.5Co35.5)72.0 | 46.0 dB |
| Gd29.2(Fe64.5Co35.5)70.8 | 46.5 dB |
| Gd30.0(Fe64.5Co35.5)70.0 | 46.8 dB |
| Gd31.2(Fe64.5Co35.5)68.8 | 46.8 dB |
| Gd32.0(Fe64.5Co35.5)68.0 | 46.5 dB |
| Gd33.5(Fe64.5Co35.5)66.5 | 46.3 dB |

As shown in Table 4, even if the atomic percentage of Gd was varied, the CNR of the medium was improved as long as Gd of 26% or more was ensured.

Example 11

Figure 15:
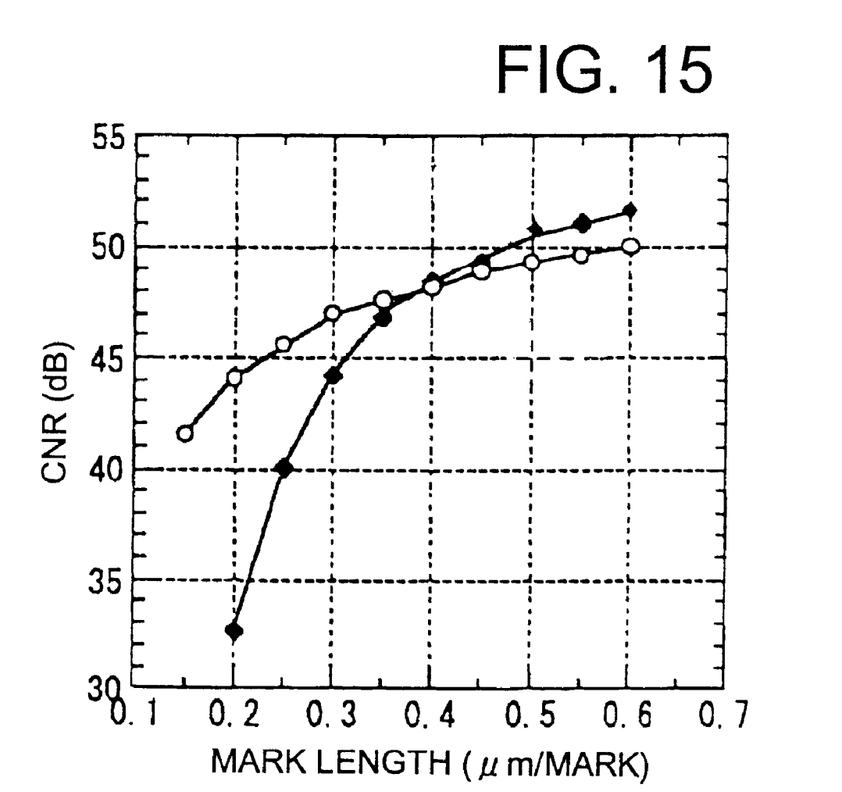
FIG. 15 is a graph illustrating a mark length dependence of CNR.

With respect to the media formed in Examples 4 and 8, the recording mark length was varied and then CNR values of the obtained media were measured. FIG. 15 shows a recording mark length dependence of CNR.

Referring to FIG. 15 (○ indicates the medium of Example 4 and ● indicates the medium of Example 8), and provided that a standard for practical application is CNR=45 dB, the media of Examples 4 and 8 can be used to provide practical media having characteristics as shown in Table 5.

TABLE 5

| Medium | Capacity (3.5 inch) | Minimum mark length (1,7) RLL | Track pitch | Density (Gbit/inch$^2$) |
|---|---|---|---|---|
| Ex. 4 | 3.7 GB | 0.31 μm | 0.4 μm | 6.9 |
| Ex. 8 | 5.7 GB | 0.23 μm | 0.35 μm | 10.7 |

In the magneto-optical recording medium for recording/reproducing data through light irradiation on a magnetic film side of the medium, the orientation of magnetization of the magnetic film varies depending on surface roughness of a layer below the magnetic film. In the medium according to the present invention, however, an in-plane magnetic film is formed in any tier between the substrate and the magnetic film, so that the magnetization orientation of the magnetic film is aligned with a substantially perpendicular direction due to a magnetic force line exerted from the in-plane magnetic film. Therefore, high CNR is realized.

What is claimed is:

1. A magneto-optical recording medium for recording and reproducing data through light irradiation on a magnetic film side of the medium, the medium comprising at least one magnetic film which is formed on a substrate and has an easy axis of magnetization in a perpendicular direction and an in-plane magnetic film which is formed between the substrate and the magnetic film and has an easy axis of magnetization in an in-plane direction; wherein a reflecting heat radiation film, a first dielectric film, a magnetic film and a second dielectric film in this order are formed on the substrate, and the in-plane magnetic film is formed between the substrate and the reflecting heat radiation film, between the reflecting heat radiation film and the first dielectric film, or between the first dielectric film and the magnetic film.

2. A magneto-optical recording medium according to claim 1, wherein a reproduction enhancing film is formed between the magnetic film and the second dielectric film.

3. A magneto-optical recording medium according to claims 1 or 2, on wherein the magnetic film is a multilayer magnetic film comprising a reproducing layer, an intermediate layer and a recording layer.

4. A magneto-optical recording medium according to claim 1 or 2, wherein the in-plane magnetic film contains Gd.

5. A magneto-optical recording medium according to claim 3, wherein the in-plane magnetic film contains Gd.

* * * * *

UNITED STATES PATENT AND TRADEMARK OFFICE
CERTIFICATE OF CORRECTION

PATENT NO. : 6,754,140 B2  Page 1 of 1
DATED : June 22, 2004
INVENTOR(S) : Tsutomu Tanaka It is certified that error appears in the above-identified patent and that said Letters Patent is hereby corrected as shown below:

<u>Column 12,</u>
Line 15, please delete "on" therefor.
Line 19, please delete "claim" and insert -- claims -- in its place therefor.

Signed and Sealed this

Twelfth Day of October, 2004

JON W. DUDAS
*Director of the United States Patent and Trademark Office*